(12) United States Patent
Murata et al.

(10) Patent No.: US 12,123,819 B2
(45) Date of Patent: Oct. 22, 2024

(54) DETECTION DEVICE AND DETECTION METHOD USING CYCLONE TYPE COLLECTOR

(71) Applicant: Panasonic Intellectual Property Management Co., Ltd., Osaka (JP)

(72) Inventors: Akiko Murata, Osaka (JP); Kohei Hara, Osaka (JP); Yoshiki Sasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1074 days.

(21) Appl. No.: 16/930,449

(22) Filed: Jul. 16, 2020

(65) Prior Publication Data

US 2020/0348219 A1  Nov. 5, 2020

Related U.S. Application Data

(63) Continuation of application No. PCT/JP2019/008785, filed on Mar. 6, 2019.

(30) Foreign Application Priority Data

Apr. 24, 2018 (JP) .................. 2018-083448

(51) Int. Cl.
*G01N 15/06* (2024.01)
*B01D 45/16* (2006.01)
(Continued)

(52) U.S. Cl.
CPC ............ *G01N 15/06* (2013.01); *B01D 45/16* (2013.01); *B01D 45/18* (2013.01); *B04C 5/23* (2013.01);
(Continued)

(58) Field of Classification Search
CPC ....... B04C 2009/008; B04C 5/22; B04C 5/23; B01D 45/16; B01D 45/18; G01N 15/06
See application file for complete search history.

(56) References Cited

U.S. PATENT DOCUMENTS 6,484,594 B1 * 11/2002 Saaski .................. G01N 1/2273
73/863.21
2002/0071691 A1    6/2002 Jones et al.
(Continued)

FOREIGN PATENT DOCUMENTS

JP         7-185395        7/1995
JP      2001-248420        9/2001
(Continued)

OTHER PUBLICATIONS

Translation of WO-2016177652-A1 (Year: 2016).*
International Search Report of PCT application No. PCT/JP2019/008785 dated May 28, 2019.

*Primary Examiner* — Nathaniel J Kolb
(74) *Attorney, Agent, or Firm* — Rimon P.C.

(57) ABSTRACT

A detection device comprises a cyclone-type collection part for collecting particles contained in a gas into a collection liquid with a swirling airflow, a detection part for detecting the particles collected by the cyclone-type collection part; and a cleaning part for cleaning the cyclone-type collection part with a cleaning liquid. The cleaning part cleans the cyclone-type collection part by swirling the cleaning liquid with the swirling airflow generated in the cyclone-type collection part.

10 Claims, 9 Drawing Sheets

(51) Int. Cl.
  *B01D 45/18* (2006.01)
  *B04C 5/23* (2006.01)
  *B04C 9/00* (2006.01)
  *B04C 11/00* (2006.01)
  *B08B 3/10* (2006.01)
  *G01N 1/22* (2006.01)
  *G01N 1/24* (2006.01)
  *B04C 5/185* (2006.01)
  *G01N 15/075* (2024.01)

(52) U.S. Cl.
  CPC ............... *B04C 9/00* (2013.01); *B04C 11/00* (2013.01); *B08B 3/102* (2013.01); *G01N 1/2211* (2013.01); *G01N 1/24* (2013.01); *B04C 5/185* (2013.01); *B04C 2009/008* (2013.01); *G01N 15/075* (2024.01)

(56) References Cited

U.S. PATENT DOCUMENTS

| | | | |
|---|---|---|---|
| 2003/0115975 A1 | 6/2003 | Saaski et al. | |
| 2010/0089173 A1 | 4/2010 | Verdier et al. | |
| 2012/0302420 A1* | 11/2012 | Halpap | B04C 5/04 |
| | | | 494/37 |

FOREIGN PATENT DOCUMENTS

| | | | | |
|---|---|---|---|---|
| JP | 2010-502974 | | 1/2010 | |
| JP | 2012-052866 | | 3/2012 | |
| WO | WO-2016177652 A1 * | 11/2016 | | B01D 45/16 |

* cited by examiner

DETECTION DEVICE AND DETECTION METHOD USING CYCLONE TYPE COLLECTOR

BACKGROUND

1. Technical Field

The present disclosure relates to a detection device and a detection method for detecting, collecting, and separating fine particles and microorganisms present in a gas, and then, detecting them.

2. Description of the Related Art

In order to suppress infection of a virus such as influenza, a system capable of detecting presence of a virus in a room in real time is desired.

Patent Literature 1 discloses a device for taking air into a centrifuge chamber for collecting and separating fine particles and microorganisms present in the air.

Patent Literature 2 discloses a virus collection device capable of collecting a virus present in air and a virus inspection system for detecting the presence or absence of the virus.

CITATION LIST

Patent Literature

Patent Literature 1: Japanese Patent Application Publication No. 2010-502974
Patent Literature 2: Japanese Patent Publication No. 5552001

SUMMARY

However, for example, in the system disclosed in Patent Literature 2, when the fine particles and microorganisms such as a virus in the air (hereinafter, referred to as target detection particles) are collected into a liquid sample in a collection part such as a cyclone to sense the target detection particles, the liquid sample is scattered and dried in the cyclone during the collection, and the target detection particles that have not been taken into the liquid sample adhere to an inner wall of the cyclone.

In addition, the target detection particles remain as a residue in the liquid sample remaining on the inner wall of the cyclone after the liquid sample in which the target detection particles have been taken is discharged from the cyclone.

In order to detect the target detection particles in real time, it is necessary to continuously perform operations of collecting the target detection particles in the liquid sample and detecting the target detection particles from the liquid sample in which the target detection particles have been collected. However, if the collection and the detection of the target detection particles are repeatedly performed, there is a problem that the detection accuracy of the target detection particles is lowered due to contamination of the residue.

The present disclosure provides a detection device capable of continuously detecting target detection particles with high accuracy.

The detection device according to one aspect of the present disclosure comprises:

a cyclone-type collection part for collecting particles contained in a gas into a collection liquid using a swirling airflow;

a detection part for detecting the particles collected by the cyclone-type collection part; and a cleaning part for cleaning the cyclone-type collection part using a cleaning liquid, wherein the cleaning part swirls the cleaning liquid with the swirling airflow generated in the cyclone-type collection part to clean the cyclone-type collection part.

These comprehensive or specific modes may be realized by a system, a method, an integrated circuit, a computer program, or a computer-readable recording medium such as a CD-ROM. These comprehensive or specific modes may also be realized by any combination of the system, the method, the integrated circuit, the computer program, and the recording medium.

According to the detection device according to one aspect of the present disclosure, it is possible to detect target detection particles continuously with high accuracy.

Figure 1:
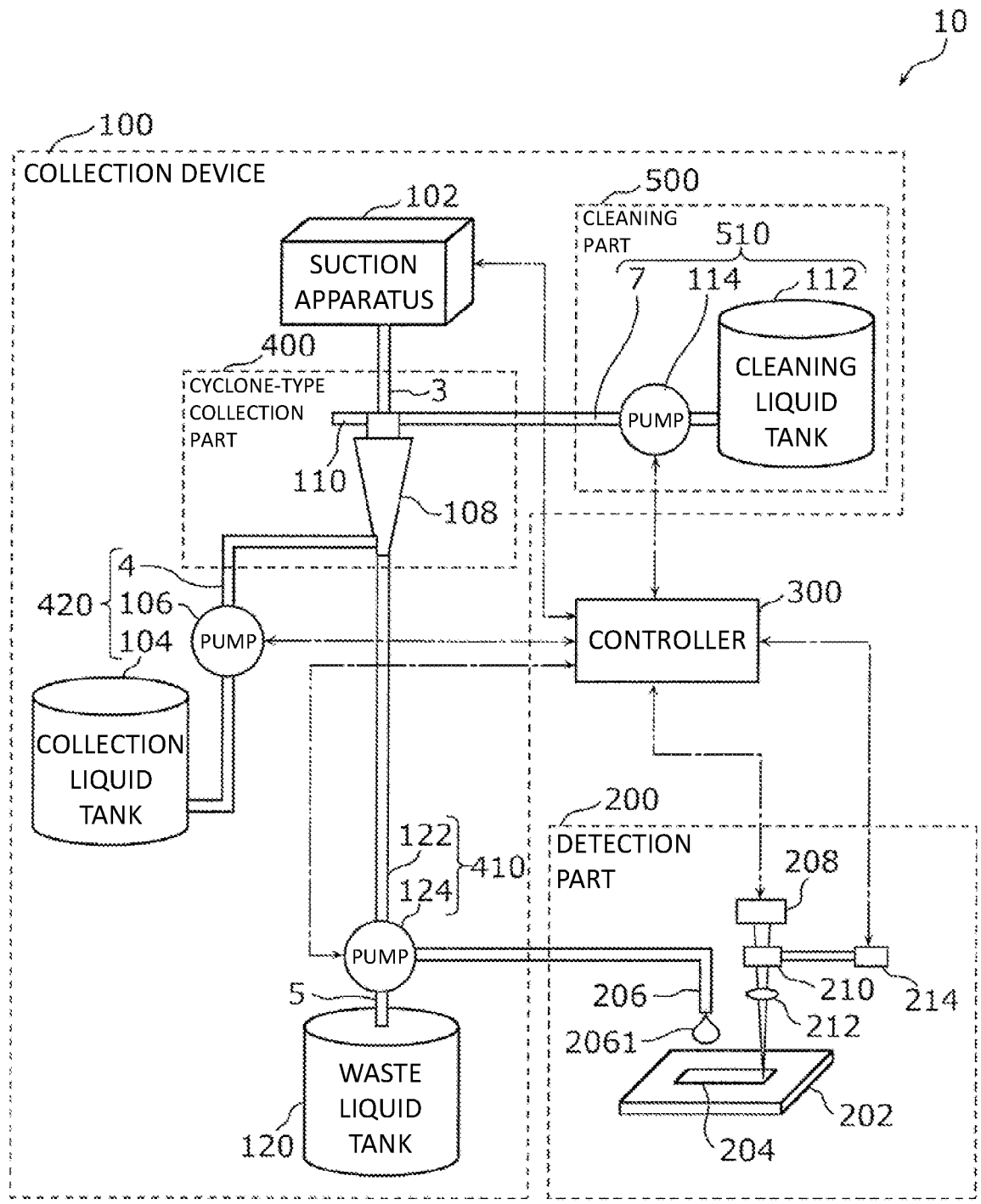
FIG. 1 is a schematic configuration diagram of a detection device according to an embodiment.

DETAILED DESCRIPTION OF THE EMBODIMENT (Findings which have Established the Fundamentals of the Present Disclosure)

As described above, in order to detect target detection particles in real time, it is necessary to continuously perform sensing; however, accuracy of measurement is lowered due to the contamination of the above residue.

The detection device according to one aspect of the present disclosure comprises:

a cyclone-type collection part for collecting particles contained in a gas into a collection liquid using a swirling airflow;

a detection part for detecting the particles collected by the cyclone-type collection part; and a cleaning part for cleaning the cyclone-type collection part using a cleaning liquid, wherein the cleaning part swirls the cleaning liquid with the swirling airflow generated in the cyclone-type collection part to clean the cyclone-type collection part.

According to this configuration, the detection device according to one aspect of the present disclosure can clean the cyclone-type collection part with a small amount of the cleaning liquid, since the cleaning liquid is swirled with the swirling airflow. Therefore, even if the collection of the target detection particles (for example, viruses) in the gas (specifically, air) and the detection of the collected target detection particles are repeatedly performed continuously, decrease in the detection accuracy can be suppressed. In other words, according to the detection device according to one aspect of the present disclosure, it is possible to continuously detect the target detection particles with high accuracy. In addition, since the amount of the cleaning liquid can be made small, it is possible to downsize a cleaning liquid tank for supplying the cleaning liquid and a waste liquid tank to which the used cleaning liquid is discharged. Therefore, the whole of the detection device can be downsized. In addition, when the cyclone-type collection part is cleaned, the cleaning part utilizes the swirling airflow used when the target detection particles are collected. Therefore, the cleaning part can clean the cyclone-type collection part with a simple configuration without providing a separate mechanism for generating a swirling airflow.

In the detection device according to the one aspect of the present disclosure, the cyclone-type collection part may comprise a cyclone for containing the collection liquid, wherein the cyclone has a gas introduction port for introducing the gas and a gas discharge port for discharging the gas;

the detection device further may comprise a suction apparatus which is connected to the gas discharge port, with which the gas is introduced in the cyclone from the gas introduction port, with which the gas is caused to flow from the gas introduction port to the gas discharge port as swirling airflow, and with which the gas is discharged from the gas discharge port;

the cleaning part may comprise a cleaning liquid introduction part for introducing the cleaning liquid into the cyclone; and the cleaning part may swirl the cleaning liquid by introducing the cleaning liquid into the cyclone with the cleaning liquid introduction part, while the gas is discharged from the gas discharge port by the suction apparatus, to clean an inside of the cyclone.

According to this configuration, the cleaning part can clean the inside of the cyclone uniformly. Therefore, according to this configuration, the detection device can continuously detect the target detection particles with higher accuracy.

In the detection device according to the one aspect of the present disclosure, the detection device further may comprise a liquid discharge part for discharging the collection liquid in the cyclone; and the cyclone further may comprise a liquid discharge port for discharging the collection liquid in the cyclone; and the cleaning part may perform cleaning by introducing the cleaning liquid from the cleaning liquid introduction part to the cyclone with the cleaning liquid introduction part and by discharging the cleaning liquid from the liquid discharge port with the liquid discharge part, while the gas is discharged from the gas discharge port with the suction apparatus.

According to this configuration, the cleaning part can clean the inside of the cyclone more uniformly. Therefore, according to this configuration, the detection device can continuously detect the target detection particles with higher accuracy.

In the detection device according to the one aspect of the present disclosure, the cyclone further may have at least one cleaning liquid introduction port for introducing the cleaning liquid;

the liquid discharge port may be located at a bottom part of the cyclone;

the cleaning liquid introduction port may be located at an upper part of the cyclone; and a distance between the cleaning liquid introduction port and the bottom part of the cyclone may be equal to or greater than a distance between the gas introduction port and the bottom part of the cyclone.

According to this configuration, the cleaning liquid can easily flow uniformly along an inner wall of the cyclone from the upper part to the bottom part (lower part) of the cyclone. Therefore, according to this configuration, the cleaning part can clean the inside of the cyclone more uniformly. In this way, the detection device can detect the target detection particles continuously with higher accuracy.

In the detection device according to the one aspect of the present disclosure, the cyclone may have a plurality of cleaning liquid introduction ports; and the plurality of the cleaning liquid introduction ports may be arranged at equal intervals along a circumferential direction of the cyclone in a top view of the cyclone.

According to this configuration, the cleaning liquid is introduced into the cyclone from a plurality of locations spaced at regular intervals. Therefore, according to this configuration, the inner wall surface of the cyclone can be cleaned more uniformly. In this way, the detection device can detect the target detection particles continuously with higher accuracy.

In the detection device according to the one aspect of the present disclosure, the cyclone may have a plurality of cleaning liquid introduction ports; and the plurality of the cleaning liquid introduction ports may be arranged at equal intervals along a circumferential direction of the cyclone in a top view of the cyclone.

According to this configuration, a trajectory of the swirling airflow is changed, as the speed is changed. Therefore, since the speed of the swirling airflow is changed, how the cleaning liquid which is used for cleaning the cyclone-type collection part is moved by the swirling airflow is also changed. In this way, the cleaning part can clean the cyclone-type collection part more uniformly. Therefore, according to this configuration, the detection device can continuously detect the target detection particles with higher accuracy.

In the detection device according to the one aspect of the present disclosure, the cleaning part may clean the cyclone-type collection part by repeating control in which the speed of the swirling airflow is changed from a first speed to a second speed which is faster than the first speed, and is further changed from the second speed to the first speed.

According to this configuration, the cleaning liquid which is used for cleaning the cyclone-type collection part can easily remove dirt that cannot be removed at a time, since the change in the speed of the swirling airflow is repeated. As a result, the cleaning part can clean the cyclone-type collection part with few residue. Therefore, according to this configuration, the detection device can continuously detect the target detection particles with higher accuracy.

The detection method according to one aspect of the present disclosure comprises:

collecting particles contained in a gas into a collection liquid using a swirling airflow;

detecting the particles collected in the collection liquid; and swirling a cleaning liquid with the swirling airflow to clean a cyclone-type collection part.

According to this method, since the cleaning liquid is used by using the swirling airflow, and the cleaning liquid is moved by the swirling airflow, the cyclone-type collection part can be cleaned with a small amount of the cleaning liquid. Therefore, even if the target detection particles contained in the gas are continuously measured, decrease in the detection accuracy can be suppressed. In other words, according to the detection method according to one aspect of the present disclosure, it is possible to continuously detect the target detection particles with high accuracy.

These comprehensive or specific aspects may be realized by a system, a method, an integrated circuit, a computer program, or a computer-readable recording medium such as a CD-ROM. These comprehensive or specific aspects may be realized by any combination of the system, the method, the integrated circuit, the computer program, and the recording medium.

Hereinafter, embodiments of the present disclosure will be specifically described with reference to the drawings.

It should be noted that each of the embodiments which will be described below shows a comprehensive or specific example. The numerical values, shapes, materials, constituent elements, arrangement positions and connection forms of the constituent elements, steps, and order of the steps which will be shown in the following embodiments are merely examples, and are not intended to limit the scope of claims. In addition, among the constituent elements in the following embodiments, the constituent elements that are not recited in the independent claims indicating the highest concept are described as optional constituent elements.

In addition the drawings are not necessarily shown accurately. In each figure, substantially the same configuration is denoted by the same reference numeral, and redundant description is omitted or simplified.

Further, in the following embodiment, a case will be described in which the target detection particles that are substances to be detected are components constituting a virus that floats in the air. Hereinafter, the target detection particles that are substances to be detected are simply referred to as "particles". Hereinafter, the virus that floats in the air is simply referred to as a virus. However, the particles are not limited to this in the present disclosure. The component constituting the virus is, for example, a protein constituting the virus or a nucleic acid thereof. The kind of the virus is not particularly limited, and any virus can be included, as long as it is generally classified as a virus. Also, the particles do not have to be viruses.

In addition, in the present specification, the terms "upper part" and "lower part (bottom part)" do not refer to an upward direction (vertically upward) and a downward direction (vertically downward) in absolute space recognition. The terms "upper part" and "lower part" are not only used when two constituent elements are spaced apart from each other in such a way that there is another constituent element between the two constituent elements but also used when two components are in close contact with each other and are in contact with each other.

EMBODIMENT

[Outline of Detection System]

FIG. 1 is a schematic configuration diagram of a detection device 10 according to the embodiment.

The detection device 10 is disposed, for example, in a room which a person enters and leaves. The detection device 10 detects, for example, a concentration of particles such as viruses floating in the air in the room in which the detection device has been disposed.

As shown in FIG. 1, the detection device 10 comprises a collection device 100, a detection part 200, and a controller 300. Hereinafter, the details of the collection device 100, the detection part 200, and the controller 300 will be described.

[Configuration of Collection Device]

First, the collection device 100 will be specifically described with reference to FIGS. 1 and 2.

Figure 2:
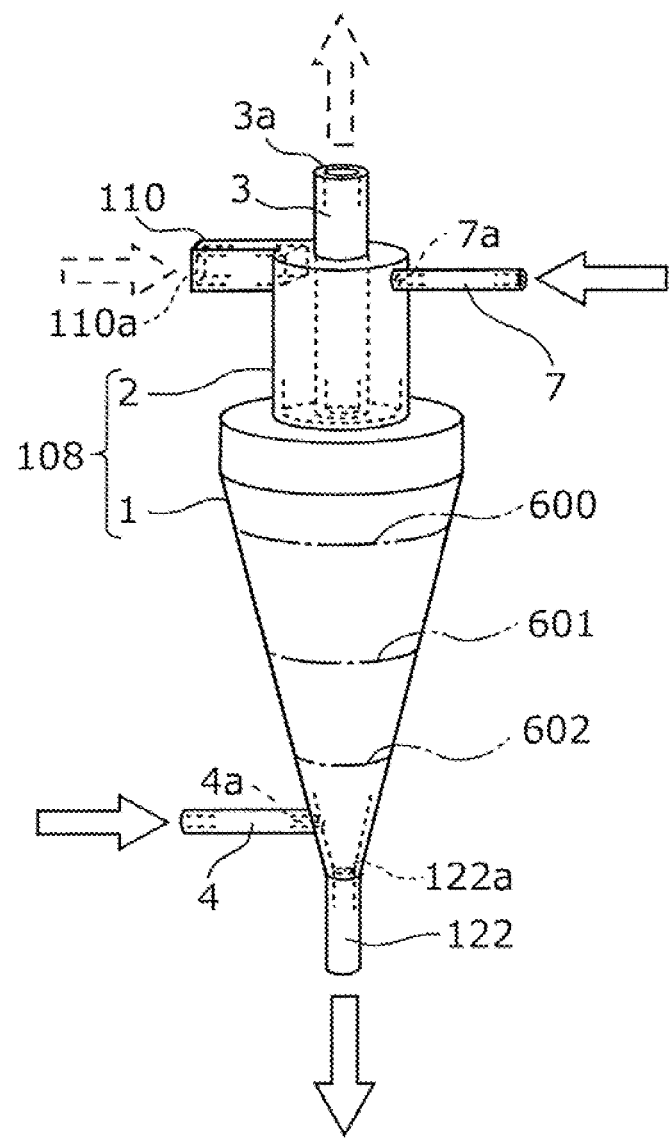
FIG. 2 is a schematic perspective view of a cyclone provided in the detection device according to the embodiment.

FIG. 2 is a schematic perspective view of a cyclone 108 provided in the detection device 10 according to the embodiment.

The collection device 100 is a device for collecting particles that may contain a virus contained in a gas such as air and mixing the particles with a collection liquid. As shown in FIG. 1, the collection device 100 comprises a cyclone-type collection part 400, a suction apparatus 102, a collection liquid introduction part 420, a cleaning part 500, a liquid discharge part 410, a waste liquid pipe 5, and a waste liquid tank 120.

The cyclone-type collection part 400 uses a swirling airflow to collect particles contained in a gas such as ambient air into a collection liquid. The cyclone-type collection part 400 comprises a gas introduction pipe 110, the cyclone 108, and a gas discharge pipe 3.

The gas introduction pipe 110 is a pipe for introducing a gas into the cyclone 108. The gas introduction pipe 110 is connected to a gas introduction port 110a formed in the cyclone 108. In FIG. 2, flow of a gas which is introduced into or discharged from the cyclone 108 is indicated by broken arrows. Flow of a liquid (specifically, a cleaning liquid or the collection liquid) is indicated by solid arrows.

The cyclone 108 has the gas introduction port 110a for introducing a gas and a gas discharge port 3a for discharging the gas, and is a housing that contains the collection liquid. Specifically, the cyclone 108 takes, with a pump 106, particles that may contain viruses in the air sucked (introduced) from the gas introduction port 110a into the collection liquid supplied (introduced) from a collection liquid tank 104. In FIG. 2, as one example of the configuration of the cyclone 108, a housing comprising a conical part 1 and a tube part 2 is shown.

The conical part 1 is a housing that is hollow in the inside thereof and connected to the tube part 2. A swirling airflow (namely, a cyclone-type flow) is generated in the cyclone 108 since the conical part 1 has a tapered shape toward the lower part thereof.

The tube part 2 is hollow in the inside thereof, and the lower part of the tube part is connected to the upper part of the conical part 1.

In addition, the cyclone 108 further has a liquid discharge port 122a through which the collection liquid in the cyclone 108 is discharged.

In addition, the cyclone 108 further has one or more cleaning liquid introduction ports 7a into which a cleaning liquid introduction part 510 provided in the cleaning part 500 introduces the cleaning liquid. The liquid discharge port 122a is located at the bottom part (namely, the lower part) of the cyclone 108, and the cleaning liquid introduction port 7a is located at the upper part of the cyclone 108.

In addition, a distance between the cleaning liquid introduction port 7a and the bottom part of the cyclone 108 is equal to or greater than a distance between the gas introduction port 110a and the bottom part of the cyclone 108. In other words, the cleaning liquid introduction port 7a is formed in the cyclone 108 at the same height as the gas introduction port 110a or at the higher position than the gas introduction port 110a. For example, a distance between the cleaning liquid introduction port 7a and the liquid discharge port 122a is equal to or greater than a distance between the gas introduction port 110a and the liquid discharge port 122a. FIG. 2 illustrates a case where the cleaning liquid introduction port 7a and the gas introduction port 110a are approximately equal in distance from the bottom part of the cyclone 108.

In addition, the cyclone 108 is connected to the detection part 200 via a liquid discharge pipe 122 provided in the liquid discharge part 410. A sample 206l, which is a collection liquid containing particles, is discharged from the cyclone 108 to the detection part 200 via the liquid discharge pipe 122.

The gas discharge pipe 3 is a pipe for discharging the gas in the cyclone 108 to the outside. The gas discharge port 3a is formed in the gas discharge pipe 3, and the gas in the cyclone 108 is discharged to the outside through the gas discharge port 3a. The suction apparatus 102 is connected to the gas discharge pipe 3.

The suction apparatus 102 is a device, for sucking the gas, connected to the gas discharge port 3a formed in the gas discharge pipe 3. The suction apparatus 102 introduces the gas around the cyclone 108 into the cyclone 108 from the gas introduction port 110a, distributes the introduced gas to the gas discharge port 3a as a swirling airflow, and discharges the gas from the gas discharge port 3a. In this way, the particles such as fine particles that may contain a virus floating in the air, which is one example of the gas around the cyclone 108, are introduced (sucked) into the cyclone 108 from the gas introduction port 110a by the suction apparatus 102 together with the air. The suction apparatus 102 is, for example, a pump for sucking the gas, or a blower.

The collection liquid introduction part 420 introduces the collection liquid for collecting the particles contained in the gas into the cyclone 108. Specifically, the collection liquid introduction part 420 comprises the collection liquid tank 104, the pump 106, and a collection liquid introduction pipe 4.

The collection liquid tank 104 is a container for holding (that is, containing) the collection liquid for collecting the particles contained in the gas. The collection liquid tank 104 is connected to the lower part of the cyclone 108 via the collection liquid introduction pipe 4. The collection liquid in the collection liquid tank 104 is supplied (namely, introduced) into the cyclone 108 with the pump 106.

The pump 106 is a pump for introducing the collection liquid in the collection liquid tank 104 into the cyclone 108. The pump 106 may comprise a valve.

The collection liquid introduction pipe 4 is a pipe that connects the collection liquid tank 104 to the cyclone 108. Specifically, a collection liquid introduction port 4*a* for introducing the collection liquid is formed at the bottom part of the cyclone 108. The collection liquid introduction pipe 4 is connected to the collection liquid introduction port 4*a* provided in the cyclone 108.

The cleaning part 500 is a mechanism for cleaning the cyclone-type collection part 400 (specifically, the inside of the cyclone 108) using the cleaning liquid. In addition, the cleaning part 500 cleans the cyclone-type collection part 400 by swirling, in the cyclone 108, the cleaning liquid with the swirling airflow generated in the cyclone-type collection part 400. Specifically, the cleaning part 500 cleans the inside of the cyclone 108 by swirling the cleaning liquid introduced into the cyclone 108 with the swirling airflow generated in the cyclone 108 by the suction apparatus 102.

In addition, the cleaning part 500 comprises the cleaning liquid introduction part 510.

The cleaning liquid introduction part 510 introduces the cleaning liquid into the cyclone 108. Specifically, the cleaning liquid introduction part 510 comprises a cleaning liquid tank 112, a pump 114, and a cleaning liquid introduction pipe 7.

The cleaning liquid tank 112 is a container for holding the cleaning liquid for cleaning the insides of the cyclone 108 and the liquid discharge pipe 122. The cleaning liquid tank 112 is connected to the upper part of the cyclone 108 via the cleaning liquid introduction pipe 7. The cleaning liquid in the cleaning liquid tank 112 is supplied into the cyclone 108 with the pump 114.

The pump 114 is a pump for introducing the cleaning liquid in the cleaning liquid tank 112 into the cyclone 108. The pump 114 may comprise a valve.

The cleaning liquid introduction pipe 7 is a pipe that connects the cleaning liquid tank 112 to the cyclone 108. Specifically, the cleaning liquid introduction port 7*a* for introducing the cleaning liquid is formed in the upper part of the cyclone 108. The cleaning liquid introduction pipe 7 is connected to the cleaning liquid introduction port 7*a* provided in the cyclone 108.

The cleaning part 500 swirls the cleaning liquid, for example, by introducing the cleaning liquid into the cyclone 108 with the cleaning liquid introduction part 510 to clean the inside of the cyclone 108, while the gas in the cyclone 108 is discharged from the gas discharge port 3*a* with the suction apparatus 102. In addition, for example, the cleaning part 500 performs cleaning by introducing the cleaning liquid into the cyclone 108 from the cleaning liquid introduction port 7*a* with the cleaning liquid introduction part 510 and by discharging the cleaning liquid from the liquid discharge port 122*a* with the liquid discharge part 410, while the gas is discharged from the gas discharge port 3*a* with the suction apparatus 102.

The liquid discharge part 410 discharges the collection liquid or the cleaning liquid in the cyclone 108 to the outside. Specifically, the liquid discharge part 410 discharges the collection liquid in the cyclone 108 to the detection part 200, and discharges the cleaning liquid in the cyclone 108 to the waste liquid tank 120. The liquid discharge part 410 comprises, for example, a pump 124 and the liquid discharge pipe 122.

The pump 124 is a pump for discharging the liquid that is the collection liquid or the cleaning liquid in the cyclone 108 to the outside of the cyclone 108. Specifically, if the liquid in the cyclone 108 is a collection liquid (specifically, the sample 2061), the pump 124 discharges the sample 2061 to an introduction part 206 provided in the detection part 200. If the liquid in the cyclone 108 is a cleaning liquid, the pump 124 discharges the cleaning liquid to the waste liquid tank 120 via the waste liquid pipe 5. The pump 124 may comprise a valve. The pump 124 may comprise a switching valve for switching a flow path of a liquid coming from the liquid discharge pipe 122 between the introduction part 206 and the waste liquid pipe 5. For example, the pump 124 may also have a switching function such that the liquid discharged from the cyclone 108 can be selectively brought into the waste liquid tank 120 or the detection part 200.

The liquid discharge pipe 122 is a pipe that connects the cyclone 108 to the introduction part 206 or the waste liquid tank 120 via the pump 124. Specifically, the liquid discharge port 122a for discharging a liquid such as the collection liquid is formed at the bottom part of the cyclone 108. The liquid discharge pipe 122 is connected to the liquid discharge port 122a provided in the cyclone 108.

The waste liquid pipe 5 is a pipe that connects the waste liquid tank 120 to the cyclone 108 via the liquid discharge pipe 122.

The waste liquid tank 120 is a container for containing a liquid such as the cleaning liquid discharged from the cyclone 108.

[Configuration of Detection Part]

Next, the detection part 200 will be specifically described with reference to FIG. 1.

The detection part 200 is a device for detecting a virus from the sample 2061 that is a collection liquid in which particles have been taken by the collection device 100. The detection part 200 comprises a sensor device 202, the introduction part 206, a light source 208, a beam splitter 210, a lens 212, and a particle detection part 214.

The sensor device 202 comprises a sensor cell 204 into which the sample 2061 is put.

The introduction part 206 introduces the sample 2061 into the sensor cell 204. The sample 2061 is a liquid that may contain the particles such as viruses, in other words, a collection liquid having a possibility that the particles discharged from the cyclone 108 have been collected.

The light source 208 is one example of a light irradiation part for irradiating the sensor cell 204 with excitation light. As the light source 208, a publicly known technique can be used without any particular limitation. For example, a semiconductor laser may be used as the light source 208.

The beam splitter 210 allows the excitation light from the light source 208 to pass therethrough. By the beam splitter 210, the fluorescence generated in the sensor cell 204 is separated and guided to the particle detection part 214.

The lens 212 condenses the excitation light that has passed through the beam splitter 210 from the light source 208 onto the sensor cell 204 which serves as a detection region.

The particle detection part 214 divides the fluorescence that has passed through the beam splitter 210 and the lens 212, and detects light having a specific wavelength band. The particle detection part 214 outputs an electrical signal which represents the amount of the particles such as viruses in the sample 2061.

The particle detection part 214 can use a publicly known technique without particular limitation, as long as the particle detection part 214 can detect light having specific wavelength band. For example, as the particle detection part 214, an interference filter through which a specific wavelength band is allowed to pass in order to split light, a Czerny spectrometer that performs spectroscopic analysis using a diffraction grating, an echelle spectrometer can be used. Further, the particle detection part 214 may include a notch filter for removing excitation light from the light source 208 or a long path filter capable of blocking excitation light from the light source 208 and allowing fluorescence generated by the sensor cell 204 to pass therethrough.

[Configuration of Controller]

Next, the details of the controller 300 will be specifically described.

The controller 300 controls the operation of the entire of the detection device 10. Specifically, the controller 300 controls the collection device 100 and the detection part 200. More specifically, the controller 300 controls the start of measurement, causes the suction apparatus 102 to start sucking the air around the cyclone 108, and causes the pump 106 to supply the collection liquid from the collection liquid tank 104 to the cyclone 108. As a result, the particles in the air are taken into the collection liquid contained in the cyclone 108.

In addition, the controller 300 controls the pump 124 to supply the sample 2061, which is a collection liquid in which the particles have been taken, from the cyclone 108 to the detection part 200.

In addition, the controller 300 causes the light source 208 to emit light and causes the particle detection part 214 to detect fluorescence. For example, the controller 300 can control each pump under a preset condition based on the input parameter to cause a predetermined volume of the sample 2061 to be supplied to the detection part 200.

Further, the controller 300 has a timer function, and may generate and store information on the time required for each operation. Further, the controller 300 may receive a measurement value from the detection part 200 and calculate a temporal change in the concentration of the particles such as viruses floating in the air based on the measurement value and time information.

In addition, the controller 300 controls the suction apparatus 102 and the pump 114 to clean the cyclone-type collection part 400 by swirling the cleaning liquid using the swirling airflow. For example, the controller 300 controls the suction apparatus 102 to control the pump 114 in such a way that the cleaning liquid is introduced from the cleaning liquid introduction port 7a to the cyclone 108, while the gas from the gas discharge port 3a is discharged. Further, the controller 300 controls the suction apparatus 102 to control the pump 124 in such a way that the cleaning liquid is discharged from the liquid discharge port 122a to the waste liquid tank 120. In this way, the inside of the cyclone 108 is cleaned. As described above, the control of each constituent element provided in the detection device 10 is realized by the controller 300. In the present specification, for example, regarding the operation of cleaning the cyclone 108 performed by the cleaning part 500, specifically, even if the cleaning operation is realized by the control of each constituent element by the controller 300, the present specification may describe that the cleaning operation is executed by the cleaning part 500. For example, the suction apparatus 102 and the pump 124 are specifically controlled by the controller 300; however, regarding the cleaning operation of the cyclone-type collection part 400 (specifically, the cyclone 108) executed by the detection device 10, the present specification may describe that the cleaning part 500 cleans the cyclone-type collection part 400 (specifically, the cyclone 108) with the suction apparatus 102 and the pump 124.

The controller 300 is realized by one or more dedicated electronic circuits, for example. The one or more dedicated electronic circuits may be integrated on one chip, or may be individually formed on a plurality of chips. The controller 300 may be realized by a general-purpose processor (not shown) in place of the one or more dedicated electronic circuits and a memory (not shown) in which software programs or instructions have been stored. In this case, the processor functions as the controller 300, when the software programs or instructions are executed.

[Operation of Detection Device]

The operation of the detection device 10 configured as described above will be described with reference to FIG. 3.

Figure 3:
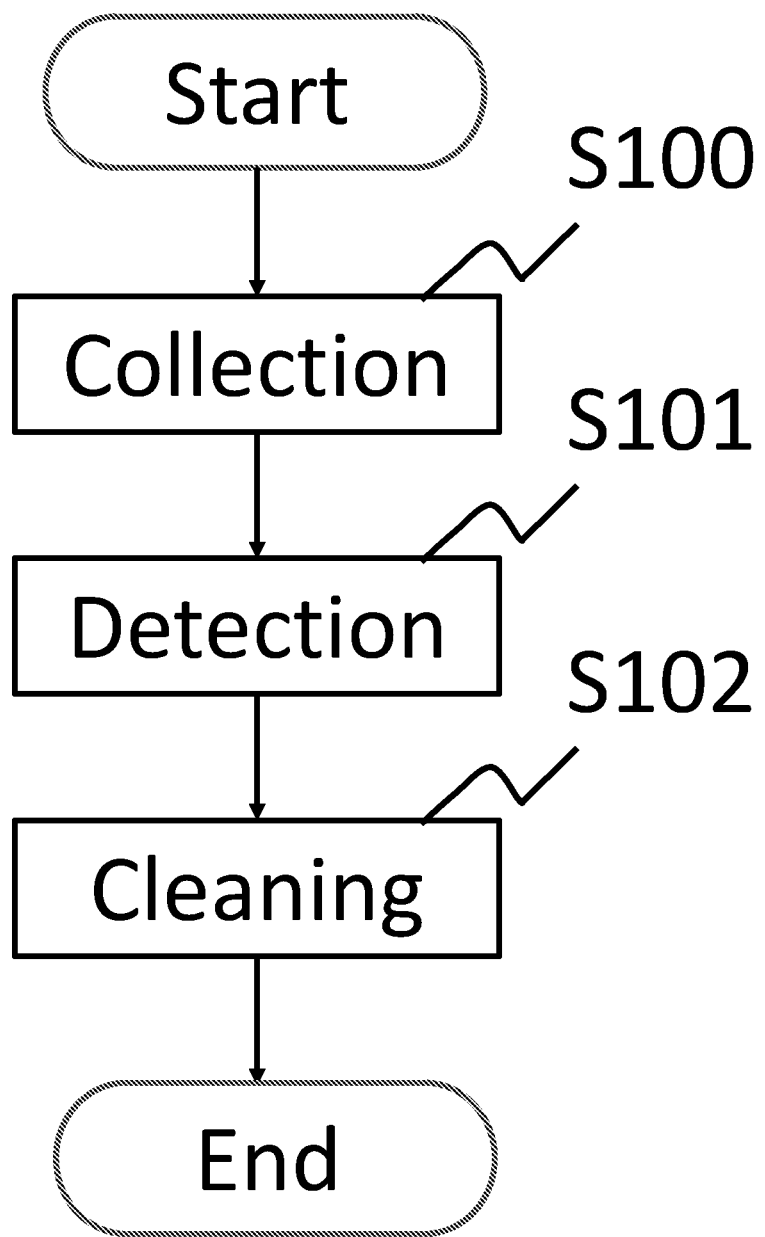
FIG. 3 is a flowchart illustrating operation procedure of the detection device according to the embodiment.

FIG. 3 is a flowchart showing an operation procedure of the detection device 10 according to the embodiment.

First, the controller 300 controls the pump 106 to introduce the collection liquid into the cyclone 108, and further controls the suction apparatus 102 to generate a swirling airflow in the cyclone 108 to collect the gas around the cyclone 108 into collection liquid contained in the cyclone 108 (step S100).

Next, the controller 300 controls the pump 124 to discharge the sample 2061 in the cyclone 108 to the detection part 200, and detects particles in the sample 2061 (step S101). Specifically, in the step S101, first, the introduction part 206 introduces the sample 2061 into the sensor cell 204. Next, the light source 208 irradiates the sensor cell 204 into which the sample 2061 has been introduced with excitation light. Next, the particle detection part 214 detects particles such as viruses in the sample 2061 by measuring fluorescence by the irradiation with the excitation light.

Next to the step S101, the cleaning part 500 cleans the cyclone-type collection part 400 by swirling the cleaning liquid with the swirling airflow generated in the cyclone-type collection part 400 (step S102). Specifically, the cleaning part 500 cleans the inside of the cyclone 108 by swirling, in the cyclone 108, the cleaning liquid introduced into the cyclone 108 with the swirling airflow generated by the suction apparatus 102. More specifically, the controller 300 controls the suction apparatus 102, the pump 114, and the pump 124 to clean the inside of the cyclone 108.

If the detection device 10 detects the particles continuously, the detection device 10 executes the step S100 again after the step S102. By executing the step S102, even when the detection device 10 continues continuously to further execute the step S100 and the step S101, the occurrence of contamination due to mixing of the particles remaining as the residues in the cyclone 108 when the previous step S101 was executed can be suppressed.

[Cleaning in Cyclone]

Next, the cleaning operation of the cyclone 108 will be described with reference to FIGS. 1, 2, and 4A to 5B. Specifically, a specific operation of the detection device 10 in the step S102 shown in FIG. 3 will be described.

The supply line 602 indicated by a dashed-dotted line in FIG. 2 indicates height of a level of a liquid after the collection liquid has been introduced into the cyclone 108. In addition, a liquid level reaching line 601 indicated by a dashed-dotted line in FIG. 2 indicates height of a level of a liquid which the collection liquid swirled by the swirling airflow generated in the cyclone 108 by suction with the suction apparatus 102 reaches. In addition, a scattering line 600 indicated by a dashed-dotted line in FIG. 2 indicates height at which the particles taken in the collection liquid adhere to the inner wall of the cyclone 108 by scattering droplets generated by the swirl of the collection liquid with the swirling airflow.

In order for the detection part 200 to measure particles with high accuracy, it is necessary to surely clean a region below the scattering line 600 on the inner wall of the cyclone 108.

If the detection device 10 continuously detects the particles, the cleaning in the cyclone 108 (step S102 shown in FIG. 3) is performed after the sample 2061 in the cyclone 108 is brought into the detection part 200 with the pump 124 and before the collection for the next measurement (step S100 shown in FIG. 3) is started.

The controller 300 supplies the cleaning liquid from the cleaning liquid tank 112 into the cyclone 108. As shown in FIG. 2, the cleaning liquid introduction port 7a is formed in the upper part of the cyclone 108. FIG. 2 illustrates a case where the cyclone 108 has one cleaning liquid introduction port 7a.

Further, the controller 300 operates the suction apparatus 102, while the controller 300 introduces the cleaning liquid into the cyclone 108, and rotates the cleaning liquid in the cyclone 108 with the swirling airflow. Thus, the cleaning liquid moves to the bottom part of the cyclone 108, while the cleaning liquid travels along the inner wall of the cyclone 108. Further, the controller 300 operates the pump 124 to discharge the cleaning liquid that has fallen to the bottom part of the cyclone 108 to the waste liquid tank 120.

As described above, the operations of the generation of the swirling airflow in the cyclone 108 with the suction apparatus 102, the introduction of the cleaning liquid into the cyclone 108, and the discharge of the cleaning liquid in the cyclone 108 are performed simultaneously, so that the inside of the cyclone 108 can be cleaned uniformly.

When the thus-executed cleaning operation is finished, the controller 300 stops the operations of the introduction of the cleaning liquid into the cyclone 108 with the pump 114, the suction with the suction apparatus 102, and the discharge of the cleaning liquid from the cyclone 108 with the pump 124 in this order. The operations are stopped in this order to allow the residue in the cyclone 108 to be further decreased. In this way, next measurement can be performed with high accuracy.

Note that the suction speed of the gas sucked by the suction apparatus 102 may be changed as appropriate. One example of how the suction speed of the suction apparatus 102 is changed is shown in FIGS. 4A and 4B.

Figure 4A:
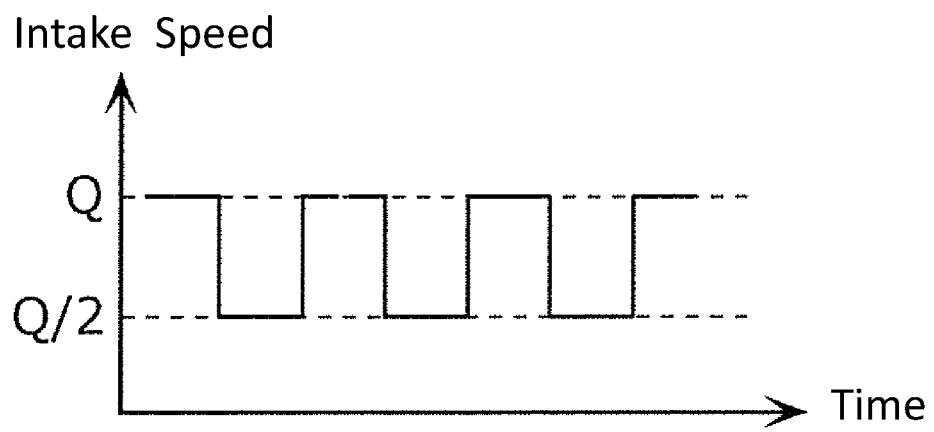
FIG. 4A is a diagram showing one example of operation of a suction apparatus provided in the detection device according to the embodiment.

FIG. 4A is a diagram illustrating one example of the operation of the suction apparatus 102 provided in the detection device 10 according to the embodiment. FIG. 4B is a diagram illustrating another example of the operation of the suction apparatus 102 provided in the detection device 10 according to the embodiment.

As shown in FIG. 4A, for example, if the controller 300 cleans the inside of the cyclone 108, the controller 300 controls the suction apparatus 102 to change the suction speed in such a manner that the suction speed Q (specifically, the suction speed Q per unit time) and Q/2, which is half of the speed of Q, are repeated every few seconds. In the present embodiment, Q is, for example, 100 L/min.

Figure 4B:
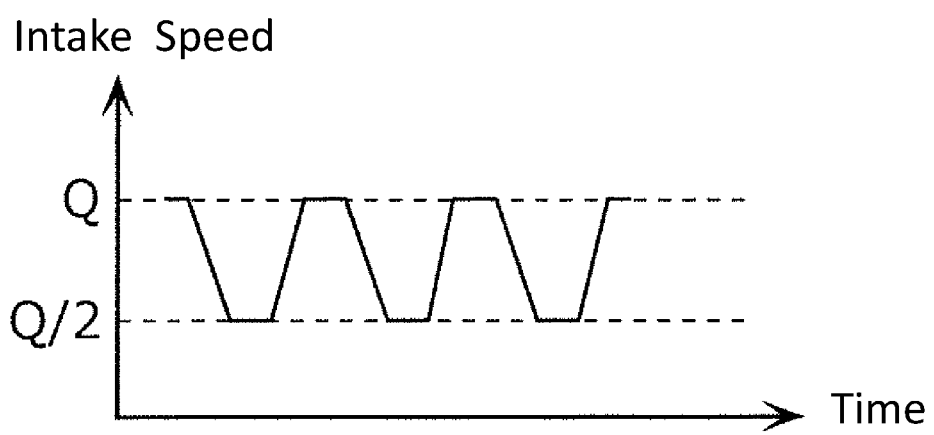
FIG. 4B is a diagram showing another example of the operation of the suction apparatus provided in the detection device according to the embodiment.

In addition, the controller 300 may control the suction apparatus 102 so that the change between Q/2 and Q is not as instantaneous as shown in FIG. 4A but as gradually as shown in FIG. 4B.

As described above, the cleaning part 500 performs cleaning, for example, by changing the speed of the swirling airflow (namely, the amount of the gas per unit time, the gas being sucked by the suction apparatus 102). Specifically, as shown in FIGS. 5A and 5B, the cleaning part 500 may clean the cyclone-type collection part 400 (specifically, the inside of the cyclone 108) by repeating the control that the speed of the swirling airflow is changed from the first speed (for example, the suction speed Q/2 shown in FIG. 4A) to the second speed (for example, the suction speed Q shown in FIG. 4A) which is faster than the first speed, and then, the speed of the swirling airflow is changed from the second speed to the first speed.

FIGS. 4A and 4B show an example in which the suction speed is changed between Q and Q/2; however, the method of changing the suction speed is not particularly limited. For example, the suction apparatus 102 may change the suction speed in such a manner that length of time for maintaining the suction speed is selectively changed in three or more stages of Q/2, Q, and 2Q, which is twice of the suction speed Q.

Figure 5A:
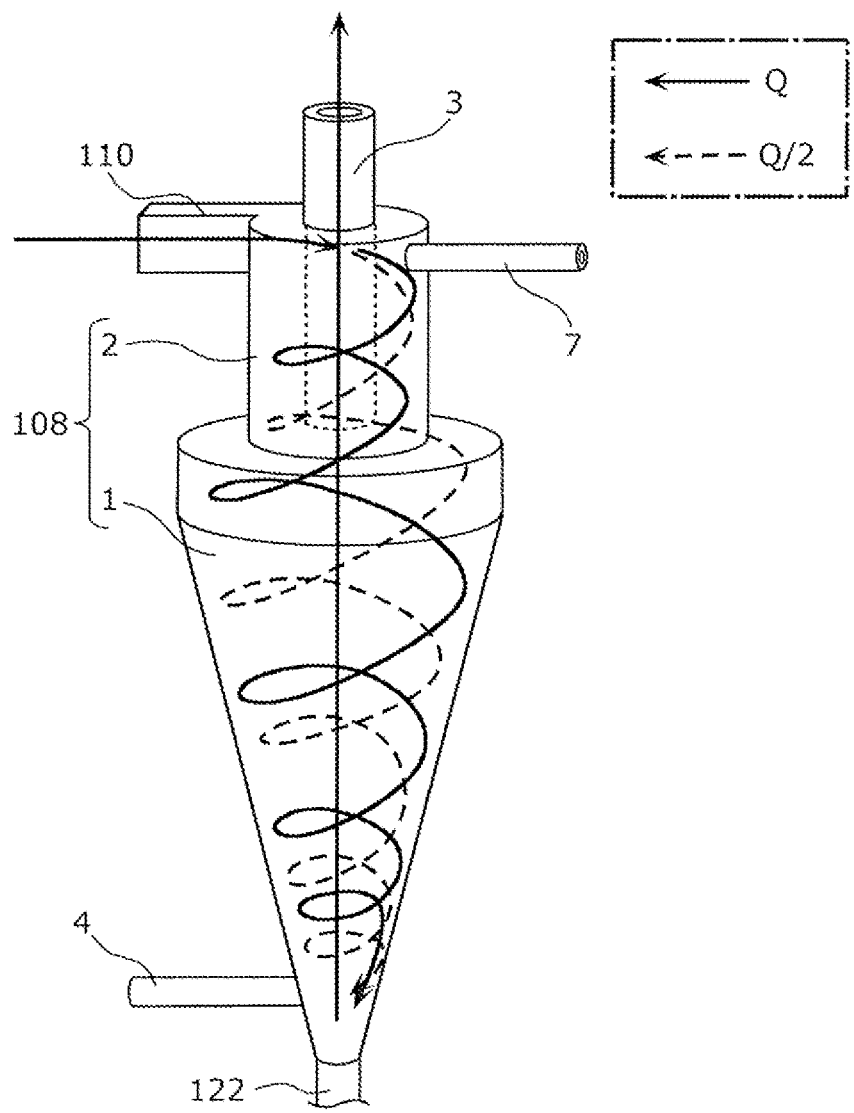
FIG. 5A is a schematic perspective view of a cyclone for illustrating a swirling airflow in the cyclone provided in the detection device according to the embodiment.
Figure 5B:
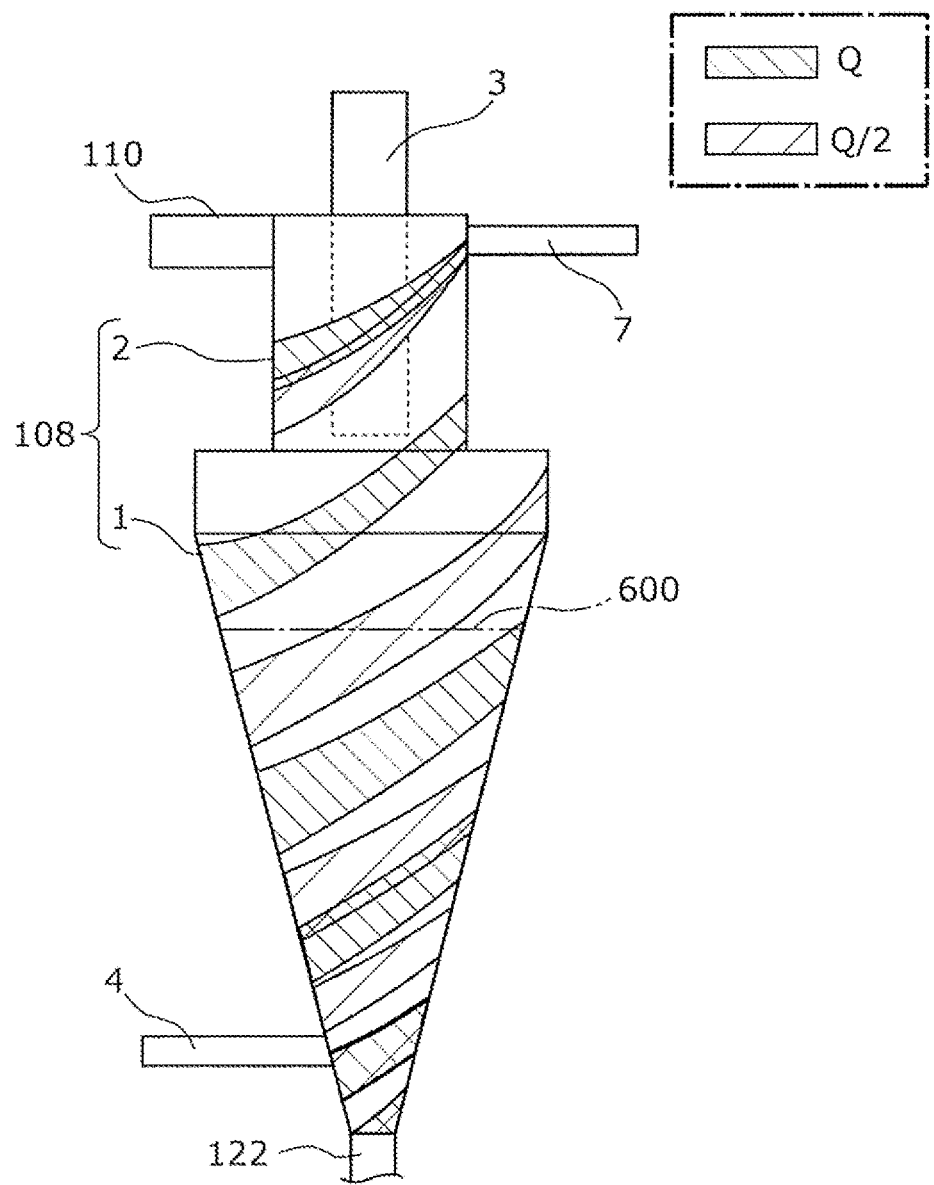
FIG. 5B is a schematic side view of the cyclone for illustrating a flow path of a cleaning liquid in the cyclone provided in the detection device according to the embodiment.

FIG. 5A is a schematic perspective view of the cyclone for illustrating the swirling airflow in the cyclone 108 provided in the detection device 10 according to the embodiment. In FIG. 5A, the flow path of the swirling airflow if the suction speed of the suction apparatus 102 is Q is indicated by a solid arrow, and the swirling airflow if the suction speed of the suction apparatus 102 is Q/2 is indicated by a dashed arrow.

As shown in FIG. 5A, if the suction speed of the suction apparatus 102 is changed, the flow path of the swirling airflow generated in the cyclone 108 is also changed.

FIG. 5B is a schematic side view of the cyclone 108 for illustrating the flow path of the cleaning liquid in the cyclone 108 provided in the detection device 10 according to the embodiment. In FIG. 5B, the flow path through which the cleaning liquid travels along the inner wall of the cyclone 108 is illustrated with hatching.

As shown in FIG. 5B, if the suction speed of the suction apparatus 102 is changed, the flow path of the cleaning liquid that travels along the inner wall of the cyclone 108 is also changed. In other words, the flow path of the cleaning liquid that travels along the inner wall of the cyclone 108 can be suitably changed by suitably changing the suction speed of the suction apparatus 102. Therefore, by cleaning the inside of the cyclone 108 while the speed of the swirling airflow is changed, the inner wall of the cyclone 108 can be more uniformly cleaned, for example, from the bottom part of the cyclone 108 to the scattering line 600.

Effects

As described above, the detection device 10 according to the embodiment comprises the cyclone-type collection part 400 for collecting the particles contained in the gas into the collection liquid using the swirling airflow, the detection part 200 for detecting the particles collected by the cyclone-type collection part 400, and the cleaning part 500 for cleaning the cyclone-type collection part 400 using the cleaning liquid. The cleaning part 500 cleans the cyclone-type collection part 400 by swirling the cleaning liquid with the swirling airflow generated in the cyclone-type collection part 400.

According to such a configuration, an amount of the residue of the previous measurement can be decreased by the configuration in which the inside of the cyclone-type collection part 400 (specifically, the cyclone 108) is cleaned. Therefore, even if the measurements of the collection of the particles contained in the gas and the detection of the collected particles are continuously repeated, it is possible to suppress a decrease in detection accuracy, so that continuous detection of the particles with higher accuracy can be allowed. Further, the cleaning part 500 rotates the cleaning liquid using the swirling airflow to clean the inside of the cyclone 108. In this way, the inside of the cyclone 108 is allowed to be uniformly cleaned without filling the inside of the cyclone 108 with the cleaning liquid. Therefore, the cleaning liquid tank 112 and the waste liquid tank 120 can be downsized, since a wide range of the inner wall surface of the cyclone 108 can be cleaned with a smaller amount of cleaning water, compared to a case where the inside of the cyclone 108 is filled with the cleaning liquid. In addition, the detection device 10 can realize, with one suction apparatus 102, suction for collecting the particles and suction for cleaning. Therefore, the cleaning part 500 can clean the cyclone-type collection part 400 with a simple configuration without having a separate mechanism for generating a swirling airflow.

For example, the cyclone-type collection part 400 has the gas introduction port 110a which introduces a gas and the gas discharge port 3a which discharges the gas, and is provided with the cyclone 108 for containing a collection liquid. The detection device 10 further comprises the suction apparatus 102 which is connected to the gas discharge port 3a, introduces the gas from the gas introduction port 110a into the cyclone 108, distributes the gas as a swirling airflow from the gas introduction port 110a to the gas discharge port 3a, and discharges the gas from the gas discharge port 3a. In addition, for example, the cleaning part 500 comprises the cleaning liquid introduction part 510 for introducing the cleaning liquid into the cyclone 108. In this case, the cleaning part 500 introduces the cleaning liquid into the cyclone 108 with the cleaning liquid introduction part 510, while the gas is discharged from the gas discharge port 3a by the suction apparatus 102. In this way, the cleaning part 500 swirls the cleaning liquid to clean the inside of the cyclone 108.

According to such a configuration, the cleaning part 500 can clean the inside of the cyclone 108 uniformly. Therefore, according to such a configuration, the detection device 10 can continuously detect the particles with higher accuracy.

In addition, for example, the detection device 10 further comprises the liquid discharge part 410 for discharging the collection liquid in the cyclone 108. In addition, for example, the cyclone 108 further has the liquid discharge port 122a for discharging the collection liquid in the cyclone 108. In this case, the cleaning part 500 introduces the cleaning liquid into the cyclone 108 from the cleaning liquid introduction port 7a with the cleaning liquid introduction part 510, while the gas is discharged from the gas discharge port 3a by the suction apparatus 102, and discharges the cleaning liquid from the liquid discharge port 122a with the liquid discharge part 410 to perform the cleaning.

According to such a configuration, the cleaning part 500 can clean the inside of the cyclone 108 more uniformly. Therefore, according to such a configuration, the detection device 10 can continuously detect the particles with higher accuracy.

Further, for example, the cyclone 108 further has one or more cleaning liquid introduction port 7a for introducing the cleaning liquid. In this case, the liquid discharge port 122a is located at the bottom part of the cyclone 108, and the cleaning liquid introduction port 7a is located at the upper part of the cyclone 108, and is farther from the bottom part of the cyclone 108 than the gas introduction port 110a.

According to such a configuration, the cleaning liquid can easily flow along the inner wall of the cyclone 108 uniformly from the upper part to the bottom part of the cyclone 108. Therefore, according to this configuration, the cleaning part 500 can clean the inside of the cyclone 108 more uniformly.

As a result, the detection device 10 can detect the particles continuously with higher accuracy.

Further, for example, the cleaning part 500 changes the speed of the swirling airflow to perform the cleaning.

According to this configuration, a trajectory of the swirling airflow changes, as the speed is changed. Therefore, since the speed of the swirling airflow is changed, how the cleaning liquid which is used for cleaning the cyclone-type collection part 400 is moved by the swirling airflow is also changed. As a result, the cleaning part 500 can clean the cyclone-type collection part 400 more uniformly. Therefore, according to this configuration, the detection device 10 can continuously detect the particles with higher accuracy.

In addition, for example, the cleaning part 500 cleans the cyclone-type collection part 400 by repeating the control that the speed of the swirling airflow is changed from the first speed to the second speed which is faster than the first speed, and then, the speed of the swirling airflow is changed from the second speed to the first speed.

According to this configuration, the cleaning liquid which is used for cleaning the cyclone-type collection part 400 can easily remove the dirt that cannot be removed at a time, since the change in the speed of the swirling airflow is repeated. As a result, the cleaning part 500 can clean the cyclone-type collection part 400 with less residue. Therefore, according to this configuration, the detection device 10 can continuously detect the particles with higher accuracy.

In addition, the detection method according to one aspect of the present disclosure comprises collecting particles contained in a gas into a collection liquid using a swirling airflow, detecting detection target particles collected into the collection liquid, and swirling a cleaning liquid using the swirling airflow to clean the cyclone-type collection part 400.

According to such a method, since the cleaning liquid is used by using the swirling airflow, and the cleaning liquid is moved more by the swirling airflow, a wide range of the cyclone-type collection part 400 can be cleaned with a small amount of the cleaning liquid. Therefore, even if the particles contained in the gas are continuously measured, decrease in the detection accuracy can be suppressed. In other words, according to the detection method according to one aspect of the present disclosure, it is possible to continuously detect the particles with high accuracy.

These comprehensive or specific aspects may be realized by a system, a method, an integrated circuit, a computer program, or a computer-readable recording medium such as a CD-ROM. These comprehensive or specific aspects may be realized by any combination of the system, the method, the integrated circuit, the computer program, and the recording medium.

Variations

Subsequently, variations of the detection device 10 according to the embodiment will be described. In the following description, differences from the embodiment will be mainly described, and description which has been set forth in the embodiment may be omitted or simplified. Although FIG. 2 illustrates the case where the cyclone 108 has one cleaning liquid introduction port 7a, the number of the cleaning liquid introduction port 7a is not limited to one. The cyclone may have a plurality of the cleaning liquid introduction ports.

First Variation

Figure 6A:
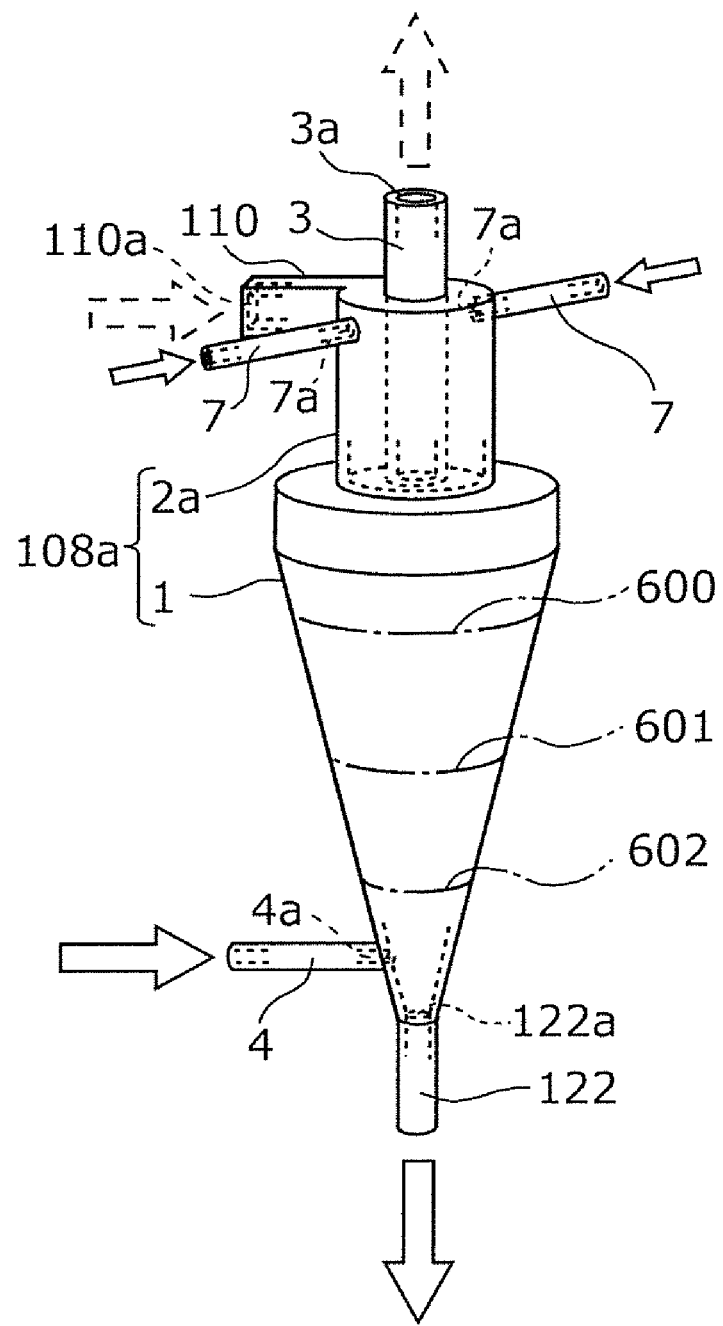
FIG. 6A is a schematic perspective view of a cyclone provided in a detection device according to a first variation of the embodiment.
Figure 6B:
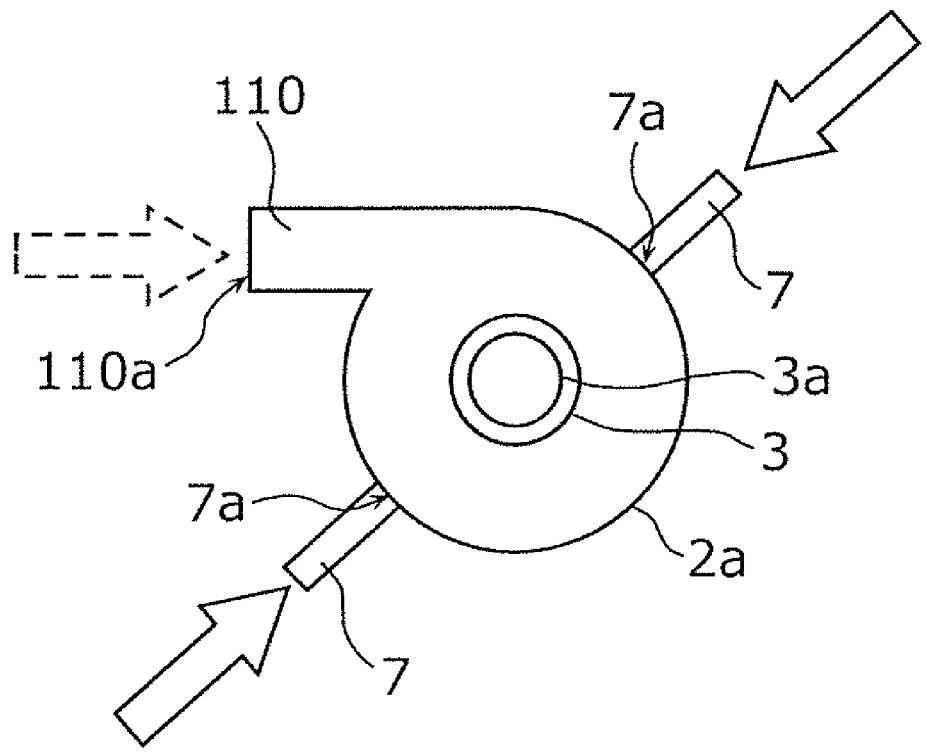
FIG. 6B is a schematic top view of the cyclone provided in the detection device according to the first variation of the embodiment.

FIG. 6A is a schematic perspective view of a cyclone 108a provided in a detection device according to the first variation of the embodiment. FIG. 6B is a schematic top view of the cyclone 108a provided in the detection device according to the first variation of the embodiment. FIG. 6B is a diagram illustrating a case where the cyclone 108a is viewed from the gas discharge port 3a.

The cyclone 108a is a housing that has the gas introduction port 110a through which a gas is introduced and the gas discharge port 3a through which the gas is discharged, and contains the collection liquid, similarly to the cyclone 108 shown, for example, in FIG. 2. In FIGS. 6A and 6B, the flow of the gas introduced into or discharged from the cyclone 108a is indicated by broken arrows, and the flow of the liquid (specifically, the cleaning liquid or the collection liquid) is indicated by solid arrows.

In addition, as shown in FIGS. 6A and 6B, unlike the cyclone 108, the cyclone 108a has two cleaning liquid introduction ports 7a at positions which face each other, if the cyclone 108a is viewed from the upper part thereof. In other words, if the cyclone 108a is viewed from the upper part thereof, the two cleaning liquid introduction ports 7a are arranged at equal intervals along the circumferential direction of the cyclone 108a.

In addition, both of the two cleaning liquid introduction ports 7a are located at the upper part of the cyclone 108a. For example, the two cleaning liquid introduction ports 7a are formed in a tube part 2a located at the upper part of the cyclone 108a. In addition, the distance between the two cleaning liquid introduction ports 7a and the bottom part of the cyclone 108a is equal to or greater than the distance between the gas introduction port 110a and the bottom part of the cyclone 108a. In other words, both of the two cleaning liquid introduction ports 7a are formed in the cyclone 108a at the same height as the gas introduction port 110a or at a position higher than the gas introduction port 110a. For example, the distance between the two cleaning liquid introduction ports 7a and the liquid discharge port 122a is not less than the distance between the gas introduction port 110a and the liquid discharge port 122a. FIG. 6A illustrates a case where the distance between the two cleaning liquid introduction ports 7a and the bottom part of the cyclone 108a is substantially equal to the distance between the gas introduction port 110a and the bottom part of the cyclone 108a.

Second Variation

Figure 7:
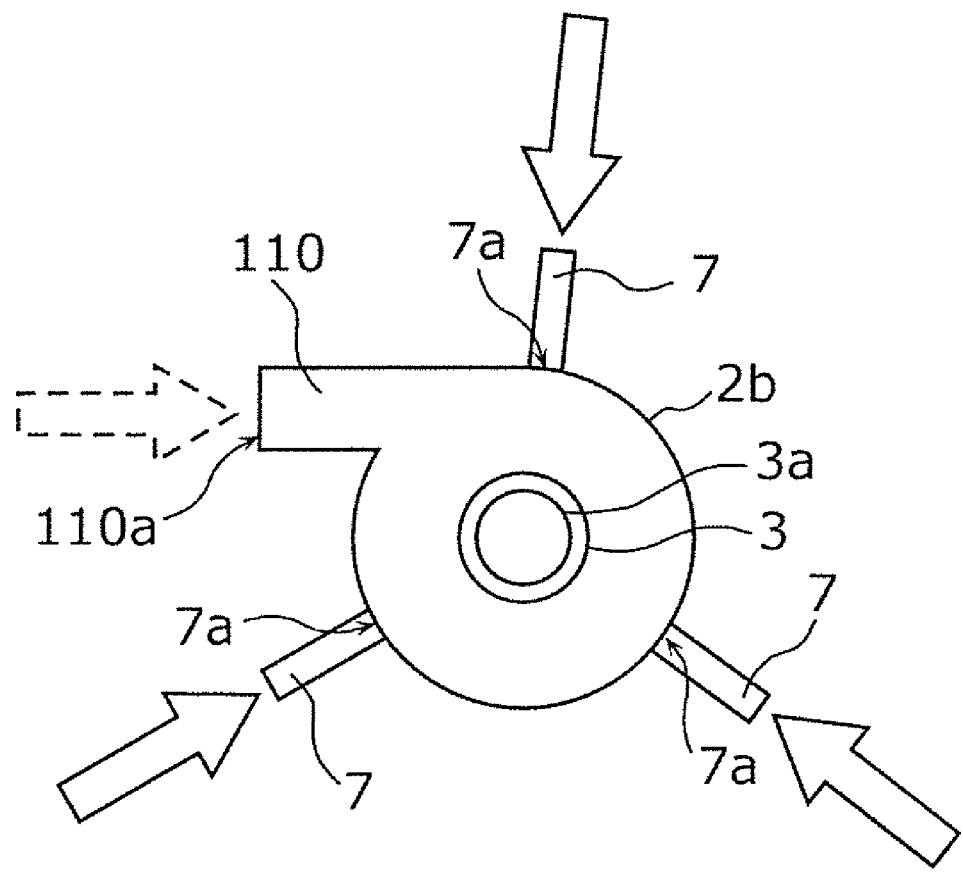
FIG. 7 is a schematic top view of a cyclone provided in a detection device according to a second variation of the embodiment.

FIG. 7 is a schematic top view of a cyclone provided in a detection device according to the second variation of the embodiment. FIG. 7 is a diagram illustrating a case where the cyclone is viewed from the gas discharge port 3a.

The cyclone according to the second variation is a housing which has a gas introduction port 110a through which a gas is introduced and a gas discharge port 3a through which the gas is discharged, and contains the collection liquid, similarly to the cyclone 108 shown, for example, in FIG. 2. In FIG. 7, the flow of the gas introduced into or discharged from the cyclone according to the second variation is indicated by a broken arrow, and the flow of the liquid (specifically, the cleaning liquid or the collection liquid) is indicated by solid arrows.

In addition, as shown in FIG. 7, the cyclone according to the second variation has three cleaning liquid introduction ports 7a, unlike the cyclone 108. In addition, if the cyclone according to the second variation is viewed from the upper part thereof, the three cleaning liquid introduction ports 7a are arranged at equal intervals along the circumferential direction of the cyclone according to the second variation.

In addition, all of the three cleaning liquid introduction ports 7a are located in the upper part of the cyclone according to the second variation. For example, all of the three cleaning liquid introduction ports 7a are formed in a tube part 2b located at the upper part of the cyclone according to the second variation. In addition, the distance between the three cleaning liquid introduction ports 7a and the bottom part of the cyclone according to the second variation is equal to or greater than the distance between the gas introduction port 110a and the bottom part of the cyclone according to the second variation. In other words, in the cyclone according to the second variation, all of the three cleaning liquid introduction port 7a are formed at the same height as the gas introduction port 110a or at a position which is higher than the gas introduction port 110a. For example, the distance between the three cleaning liquid introduction ports 7a and the liquid discharge port 122a is equal to or greater than the distance between the gas introduction port 110a and the liquid discharge port 122a.

Effects

As described above, as shown in the first variation and the second variation, the cyclone (for example, cyclone 108a) has, for example, a plurality of the cleaning liquid introduction ports 7a. In this case, the plurality of the cleaning liquid introduction ports 7a are arranged at equal intervals along the circumferential direction of the cyclone 108a, for example, when the cyclone 108a is viewed from the upper part thereof.

According to such a configuration, the cleaning liquid is introduced into the cyclone 108a from a plurality of locations spaced at regular intervals. Therefore, according to such a configuration, the inner wall surface of the cyclone 108a can be cleaned more uniformly.

Other Embodiments

Although the detection devices according to the embodiment and the variations of the present disclosure have been described on the basis of the embodiment, the present disclosure is not limited to the embodiment. The scope of one or more aspects of the present disclosure may include embodiments in which various modifications conceived by those skilled in the art have been made in the embodiment, unless the scope deviates from the gist of the present disclosure, For example, in the above embodiment, all or a part of the constituent elements of the controller 300 may be configured by dedicated hardware, or may be realized by executing a software program suitable for each constituent element. Each constituent element may be realized by a program execution part such as a CPU (Central Processing Unit) or a processor reading and executing a software program recorded on a recording medium such as an HDD (Hard Disk Drive) or a semiconductor memory.

In addition, the constituent elements of the controller 300 may be configured by one or a plurality of electronic circuits. Each of the one or more electronic circuits may be a general-purpose circuit or a dedicated circuit.

The one or the plurality of the electronic circuits may include, for example, a semiconductor device, an IC (Integrated Circuit), or an LSI (Large Scale Integration). The IC or LSI may be integrated on one chip or may be integrated on a plurality of chips. Here, it is referred to as IC or LSI; however, the name thereof changes depending on the degree of the integration, and may be referred to as system LSI, VLSI (Very Large Scale Integration), or ULSI (Ultra Large Scale Integration). In addition, an FPGA (Field Programmable Gate Array), which is programmed after manufacture of the LSI, may also be used for the same purpose.

In addition, for example, in the above embodiment, the cyclone 108 has the conical part 1 and the tube part 2. However, the shape of the cyclone 108 is not limited thereto. For example, the cyclone does not have to have the tube part 2. In this case, the gas introduction port 110a and the cleaning liquid introduction port 7a may be formed in the conical part 1.

In addition, for example, in the above-described embodiment, the cleaning liquid introduction port 7a is formed on the side wall of the tube part 2; however, the position of the cleaning liquid introduction port 7a is not limited thereto. The cleaning liquid introduction port 7a may be formed, for example, on the upper surface of the tube part 2.

In addition, embodiments provided by making various modifications conceivable by those skilled in the art to the embodiments are also included in the present disclosure. Embodiments realized by arbitrarily combining constituent elements and functions in the embodiments without deviating from the gist of the present invention are also included in the present disclosure.

INDUSTRIAL APPLICABILITY

The detection device according to the present disclosure can be used for a detection system for detecting a concentration of viruses floating in the air of a room with high sensitivity in order to lower infection risk of virus to a person staying in the room.

One aspect of the invention derived from the above disclosure will be listed below.

1. A detection device, comprising:
   - a cyclone-type collection part configured to collect particles contained in a gas into a collection liquid with a swirling airflow;
   - a suction part configured to depressurize an inside of the cyclone-type collection part to generate the swirling airflow in the cyclone-type collection part;
   - a detection part configured to detect particles collected by the cyclone-type collection part,
   - a cleaning liquid tank for storing a cleaning liquid;
   - a cleaning liquid introduction pipe that communicates between the cleaning liquid tank and the inside of the cyclone-type collection part; and
   - an electric circuit (i.e., controller),
   - wherein
   - the electric circuit is configured to:
     - supplies the cleaning liquid through the cleaning liquid introduction pipe from the cleaning liquid tank to the inside of the cyclone-type collection part; and
     - generates the swirling airflow in the inside of the cyclone-type collection part using the suction part to clean the inside of the cyclone-type collection part using the cleaning liquid which has been supplied to the cyclone-type collection part and swirled by the swirling airflow.

REFERENCE SIGNS LIST

1 Conical part
2, 2*a*, 2*b* Tube part
3 Gas discharge pipe
3*a* Gas discharge port 4 Collection liquid introduction pipe
4a Collection liquid introduction port
5 Waste liquid pipe
7 Cleaning liquid introduction pipe
7a Cleaning liquid introduction port
10 Detection device
100 Collection device
102 Suction apparatus
104 Collection liquid tank
106, 114, 124 Pump
108, 108 Cyclone
110 Gas introduction pipe
110a Gas introduction port
112 Cleaning liquid tank
120 Waste liquid tank
122 Liquid discharge pipe
122a Liquid discharge port
200 Detection part
202 Sensor device
204 Sensor cell
206 Introduction part
208 Light source
210 Beam splitter
212 Lens
214 Particle detection part
300 Controller
400 Cyclone-type collection part
410 Liquid discharge part
420 Collection liquid introduction part
500 Cleaning part
510 Cleaning liquid introduction part
600 Scattering line
601 Liquid level reaching line
602 Supply line
2061 Sample

The invention claimed is:
1. A detection device, comprising:
a cyclone-type collection part for collecting particles contained in a gas into a collection liquid using a swirling airflow;
a detection part for detecting the particles collected by the cyclone-type collection part;
a cleaning part for cleaning the cyclone-type collection part using a cleaning liquid; and
a controller configured to change a speed of the swirling airflow during a cleaning of the cyclone-type collection part, wherein:
the cleaning part swirls the cleaning liquid with the swirling airflow generated in the cyclone-type collection part to clean the cyclone-type collection part,
the cyclone-type collection part comprises a cyclone for receiving the collection liquid and a tube attached to the cyclone at a first side of the cyclone,
the cyclone-type collection part includes a gas introduction port for introducing the gas to the cyclone and a gas discharge port for discharging the gas from the cyclone at the first side of the cyclone, the gas introduction port being attached to the tube,
the cyclone further comprises a cleaning liquid introduction port for introducing the cleaning liquids at the first side and a liquid discharge port for discharging the collection liquid in the cyclone at a second side opposite to the first side with respect to the cyclone, the cleaning liquid introduction port being attached to the tube at a different position of the tube than the gas introduction port, and a distance between the cleaning liquid introduction port and the bottom part of the cyclone is greater than a distance between the gas introduction port and the bottom part of the cyclone.
2. The detection device according to claim 1, wherein:
the detection device further comprises a suction apparatus which is connected to the gas discharge port, with which the gas is introduced in the cyclone from the gas introduction port, with which the gas is caused to flow from the gas introduction port to the gas discharge port as swirling airflow, and with which the gas is discharged from the gas discharge port,
the cleaning part comprises a cleaning liquid introduction part for introducing the cleaning liquid into the cyclone, and
the cleaning part swirls the cleaning liquid by introducing the cleaning liquid into the cyclone with the cleaning liquid introduction part, while the gas is discharged from the gas discharge port by the suction apparatus, to clean an inside of the cyclone.
3. The detection device according to claim 2, wherein:
the detection device further comprises a liquid discharge part for discharging the collection liquid in the cyclone and coupled to the liquid discharge port of the cyclone, and
the cleaning part performs cleaning by introducing the cleaning liquid from the cleaning liquid introduction part to the cyclone with the cleaning liquid introduction part and by discharging the cleaning liquid from the liquid discharge port with the liquid discharge part, while the gas is discharged from the gas discharge port with the suction apparatus.
4. The detection device according to claim 3, wherein:
the liquid discharge port is located at a bottom part of the cyclone closer to the second side than the first side.
5. The detection device according to claim 4, wherein:
the cyclone has a plurality of cleaning liquid introduction ports, and
the plurality of the cleaning liquid introduction ports are arranged at equal intervals along a circumferential direction of the cyclone in a top view of the cyclone.
6. The detection device according to claim 5, wherein
the cleaning part cleans the cyclone-type collection part by repeating control in which the speed of the swirling airflow is changed from a first speed to a second speed which is faster than the first speed, and is further changed from the second speed to the first speed.
7. The detection device according to claim 1, wherein:
the cyclone has a conical housing that is hollow in inside, and has a tapered shape from the first side to the second side, and
the gas flows from the first side to the second side.
8. A detection method, comprising:
collecting particles contained in a gas into a collection liquid using a swirling airflow;
detecting the particles collected in the collection liquid; and
swirling a cleaning liquid with the swirling airflow to clean a cyclone-type collection part, while speed of the swirling airflow is changed between a first speed and a second speed.
9. A detection device, comprising:
a cyclone-type collection part for collecting particles contained in a gas into a collection liquid using a swirling airflow;
a detection part for detecting the particles collected by the cyclone-type collection part;

a cleaning part for cleaning the cyclone-type collection part using a cleaning liquid; and a controller configured to change a speed of the swirling airflow during a cleaning of the cyclone-type collection part, wherein:

the cyclone-type collection part comprises a gas introduction port, a gas introduction pipe connected to the gas introduction port through which the gas is introduced, a gas discharge port through which the gas is discharged, a cleaning liquid introduction port, and a cleaning liquid introduction pipe connected to the cleaning liquid introduction port through which the cleaning liquid is introduced, and a liquid discharge port through which the collection liquid is discharged, the cyclone-type collection part further comprises a cyclone for receiving the collection liquid, the liquid discharge port is located at a bottom part of the cyclone, the gas discharge port and the gas introduction port are located at a top of the cyclone, the cleaning liquid introduction port is located at an upper part of the cyclone, a distance between the cleaning liquid introduction port and the bottom part of the cyclone is longer than a distance between the gas introduction port and the bottom part of the cyclone, and the cleaning part swirls the cleaning liquid with the swirling airflow generated in the cyclone-type collection part to clean the cyclone-type collection part.

10. The detection device according to claim 9, wherein:

the cyclone has a conical housing that is hollow in inside, and has a tapered shape from the first side to the second side, and the gas flows from the first side to the second side.

* * * * *